(12) United States Patent
Itakura

(10) Patent No.: US 8,707,770 B2
(45) Date of Patent: Apr. 29, 2014

(54) AIR FLOW MEASURING DEVICE

(71) Applicant: Denso Corporation, Kariya (JP)

(72) Inventor: Keisuke Itakura, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/676,199

(22) Filed: Nov. 14, 2012

(65) Prior Publication Data

US 2013/0125635 A1    May 23, 2013

(30) Foreign Application Priority Data

Nov. 18, 2011  (JP) ................................ 2011-252504

(51) Int. Cl.
*G01M 15/04* (2006.01)

(52) U.S. Cl.
USPC ...................................................... 73/114.32

(58) Field of Classification Search
USPC ...................................................... 73/114.32
See application file for complete search history.

(56) References Cited

U.S. PATENT DOCUMENTS

| | | | |
|---|---|---|---|
| 5,253,517 A | | 10/1993 | Molin et al. |
| 6,112,590 A | * | 9/2000 | Rilling ........................ 73/204.21 |
| 6,142,014 A | * | 11/2000 | Rilling ........................ 73/204.21 |
| 6,185,998 B1 | * | 2/2001 | Yonezawa et al. ......... 73/114.34 |
| 6,276,198 B1 | * | 8/2001 | Hueftle et al. ............. 73/204.21 |
| 6,557,409 B2 | * | 5/2003 | Setescak ..................... 73/204.21 |
| 6,920,784 B2 | * | 7/2005 | Abdolhosseini et al. .. 73/114.32 |
| 7,373,842 B2 | * | 5/2008 | Goldfarb .................... 73/861.79 |
| 7,437,926 B2 | * | 10/2008 | Kozawa et al. ............. 73/204.21 |
| 7,571,641 B2 | * | 8/2009 | Kozawa et al. ............. 73/114.32 |
| 7,905,153 B2 | * | 3/2011 | Jasnie ......................... 73/861.24 |
| 2004/0055570 A1 | * | 3/2004 | Bielicki et al. ................ 123/402 |

FOREIGN PATENT DOCUMENTS

| | | |
|---|---|---|
| JP | S60102564 A | 6/1985 |
| JP | 6026903 A | 2/1994 |
| JP | 7071985 A | 3/1995 |
| JP | 10048021 A | 2/1998 |

OTHER PUBLICATIONS

Office Action issued Nov. 12, 2013 in corresponding JP Application No. 2011-252504 (with English translation).

* cited by examiner

*Primary Examiner* — Freddie Kirkland, III

(57) ABSTRACT

An air flow measuring device includes an air flow meter (AFM), a straightening grid, and a mesh member. The AFM includes an air inlet and is configured to measure a flow rate of air flowing into the air inlet. The straightening grid includes a straightening plate having only one crossing region and is disposed on an upstream side of the AFM in a flow direction of air to straighten a flow of air toward the AFM through the straightening plate. The mesh member is formed in a netted manner and is disposed between the straightening plate and the AFM.

7 Claims, 7 Drawing Sheets

US 8,707,770 B2

AIR FLOW MEASURING DEVICE

CROSS REFERENCE TO RELATED APPLICATION

This application is based on Japanese Patent Application No. 2011-252504 filed on Nov. 18, 2011, the disclosure of which is incorporated herein by reference.

TECHNICAL FIELD

The present disclosure relates to an air flow measuring device in which a straightening grid is disposed upstream of an air flow meter (AFM) that measures an air flow rate in an air flow direction.

BACKGROUND

For technologies whereby a straightening grid is disposed on an upstream side of an AFM that measures a flow rate of intake air suctioned into an engine (internal combustion engine that generates rotative power as a result of combustion of fuel) in an air flow direction, JP-A-H06-026903, and JP-A-H07-071985 corresponding to U.S. Pat. No. 5,253,517 will be described below. According to the technology described in JP-A-H06-026903, the straightening grid is disposed on the upstream side of the AFM in the air flow direction, and an airflow inhibition member for preventing a direct inflow of air into the air inlet (flat plate perpendicular to the air flow direction) is disposed on an upstream side of an air inlet of the AFM in the air flow direction.

This straightening grid of JP-A-H06-026903 is configured through the combination of many cross shapes. There is an increased pressure loss of the straightening grid obtained by combining together many crosses in this manner in accordance with the increase in the number of crosses. Moreover, a turbulent flow is more easily produced on a downstream side of the straightening grid obtained by the combination of many crosses as the number of crosses increases. Accordingly, a signal fluctuation of the AFM is increased due to the turbulent flow. Furthermore, by the straightening grid of the combination of many crosses, a deviation of a flow speed produced in a duct cannot be averaged.

In the technology in JP-A-H06-026903, the airflow inhibition member is disposed on the upstream side of the air inlet of the AFM in the air flow direction. Consequently, the turbulent flow is generated immediately downstream of the airflow inhibition member to cause the increase in the signal fluctuation of the AFM.

According to the technology described in JP-A-H07-071985, similar to JP-A-H06-026903, the straightening grid is disposed on the upstream side of the AFM in the air flow direction. This straightening grid of JP-A-H07-071985 is configured by combining together many cross shapes similar to JP-A-H06-026903. For this reason, similar to the defects of the technology in JP-A-H06-026903, the pressure loss of the straightening grid increases in accordance with the increase in the number of crosses; a turbulent flow is more easily produced on a downstream side of the straightening grid as the number of crosses increases, to cause an increase of a signal fluctuation of the AFM; and a deviation of a flow speed produced in a duct cannot be averaged.

SUMMARY

According to the present disclosure, there is provided an air flow measuring device including an air flow meter (AFM), a straightening grid, and a mesh member. The AFM includes an air inlet and is configured to measure a flow rate of air flowing into the air inlet. The straightening grid includes a straightening plate having only one crossing region and is disposed on an upstream side of the AFM in a flow direction of air to straighten a flow of air toward the AFM through the straightening plate. The mesh member is formed in a netted manner and is disposed between the straightening plate and the AFM.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1A:
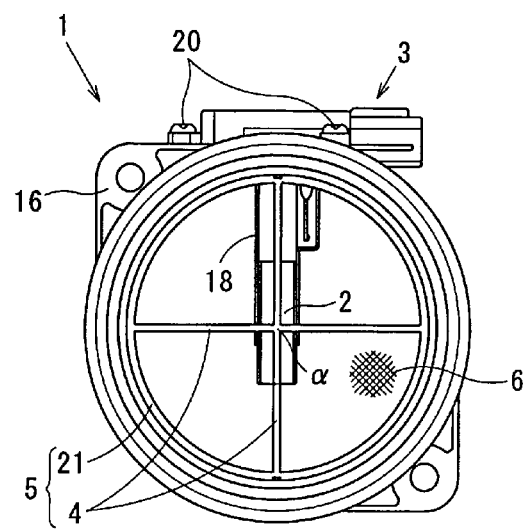
FIG. 1A is a front view illustrating an AFM assy in accordance with an embodiment.

An embodiment will be described below with reference to the accompanying drawings. An air flow measuring device 1 (AFM assy in the embodiment described below) measures a flow rate of air suctioned into an engine. The device 1 includes an AFM 3 that measures a flow rate of air flowing into an air inlet 2, and a straightening grid 5 that is disposed on an upstream side of this AFM 3 in an air flow direction to straighten a flow of air toward the AFM 3 by means of a straightening plate 4. The straightening grid 5 includes only one crossing region α (crossing position in the embodiment described below) of the straightening plate 4. A mesh member 6 having a reticulated shape is provided between the straightening plate 4 and the AFM 3 (including a rear end of the straightening plate 4).

The embodiment discloses a concrete example, and needless to say, the disclosure is not limited to the embodiment.

Figure 2:
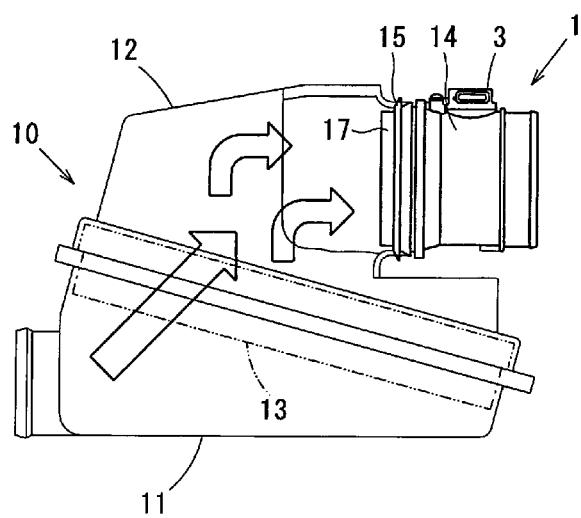
FIG. 2 is an attachment diagram illustrating the AFM assy of the embodiment.
Figure 3:
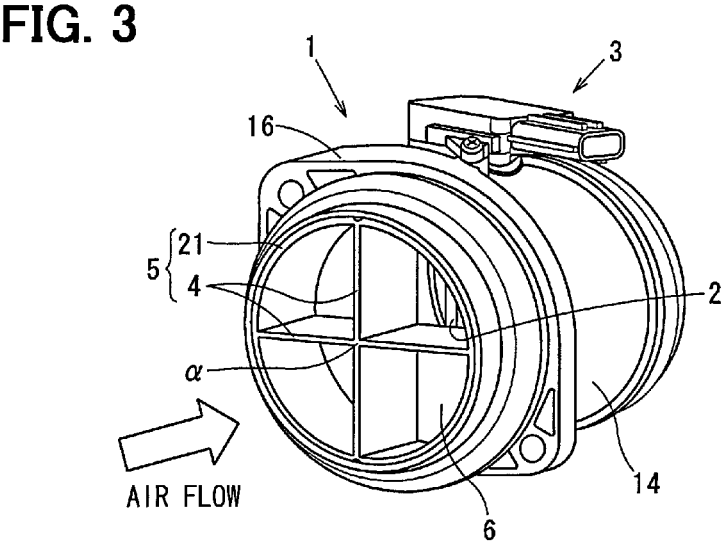
FIG. 3 is a perspective view illustrating the AFM assy of the embodiment.
Figure 4:
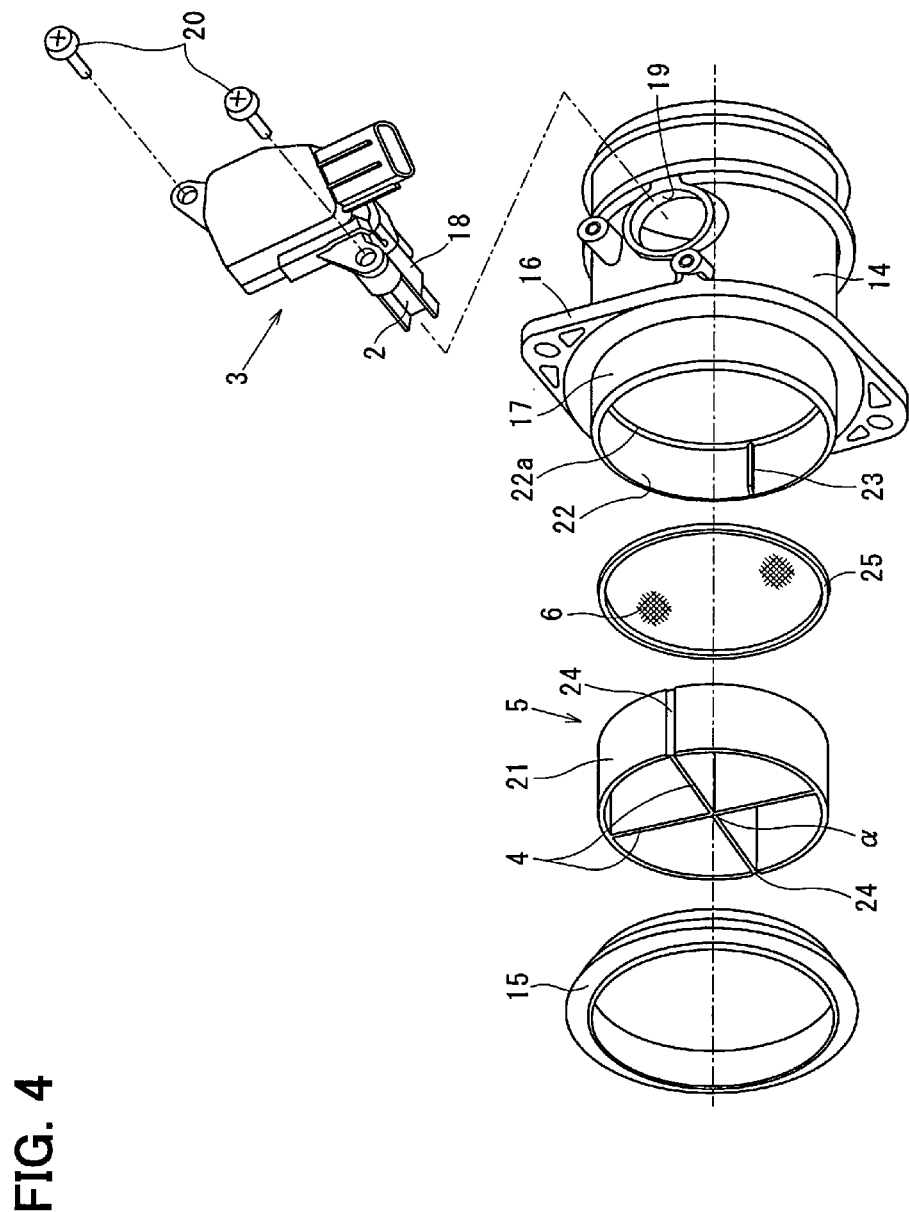
FIG. 4 is an exploded view illustrating the AFM assy of the embodiment.

The air flow measuring device of this embodiment is configured as the AFM assy (AFM unit) 1, and is used for its connection to an outlet of an air cleaner 10 as illustrated in FIG. 2. In the air cleaner 10 of FIG. 2 for a concrete example, a filter (filter element) 13 is disposed between an upstream cleaner case 11 and a downstream cleaner case 12. The AFM assy 1 is attached to to a circular hole (outlet) of the downstream cleaner case 12.

The AFM assy 1 includes a duct 14 having a cylindrical shape, the AFM 3 that measures an air flow rate (flow rate of intake air suctioned into the engine), and the straightening grid 5 and the mesh member 6, which straighten and stabilize the flow of air guided to this AFM 3. The straightening grid 5, the mesh member 6, and the AFM 3 are arranged in this order in the duct 14 from an upstream side (air cleaner side) toward a downstream side (engine side).

The duct 14 is attached to the outlet of the air cleaner 10 via a grommet 15 (packing made of rubber having a ring shape). In this embodiment, the duct 14 has a cylindrical shape whose tube length is relatively short, and is formed from a resin material as a concrete example. Specifically, a flange 16, which is fixed to the air cleaner 10 (specifically, the downstream cleaner case 12) by way of a screw or the like, is provided around the upstream side of the duct 14. An insertion cylinder 17, which is inserted in the outlet of the air cleaner 10, is provided on the upstream side of this flange 16 along the duct 14. By inserting the insertion cylinder 17 into the outlet of the air cleaner 10 with the grommet 15 attached around this insertion cylinder 17, and by fixing the flange 16 to the air cleaner 10 using a screw or the like, the AFM assy 1 is attached to the air cleaner 10.

The AFM 3 is a known flow meter including an AFM housing 18 (passage forming member) made of resin that defines therein an air passage (e.g., bypass passage) for flow measurement, and a sensor portion (using a chip-type or bobbin-type resistor) that is attached inside this AFM housing 18 to measure a flow rate of air passing through the bypass passage. The AFM 3 is inserted and fixed in the duct 14 with the air inlet 2 (inlet for the bypass passage) directed on the upstream side in the duct 14. Specifically, an AFM insertion hole 19 passing through the duct 14 is formed on a side surface of the duct 14. After a main part of the AFM housing 18 (region in which the bypass passage and so forth are formed) is inserted into the duct 14 from the outside of this AFM insertion hole 19, the AFM 3 is fixed to the duct 14 via a tapping screw 20 or the like.

Figure 5A:
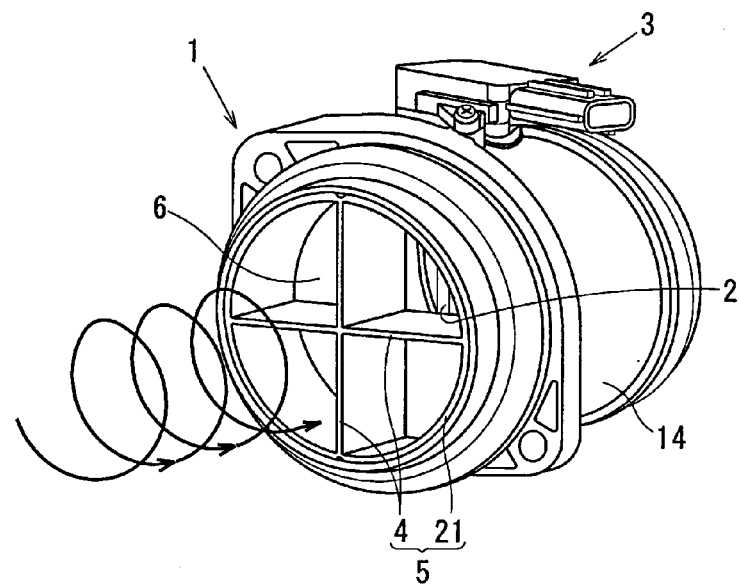
FIG. 5A is a diagram illustrating a swirl flow according to the embodiment.

The straightening grid 5 is disposed at a upstream region of the duct 14 to straighten a swirl flow of air toward the air inlet 2 of the AFM 3 (see arrows in FIG. 5A) into a linear flow as illustrated in FIG. 5A. The straightening grid 5 has a shape obtained by making intersect crosswise with each other the straightening plates 4 that are along a flow line direction of the duct 14 (tube length direction of the duct 14). Specifically, the straightening grid 5 is a resin molded product, and is inserted to an inner peripheral part of the upstream side of the duct 14. This straightening grid 5 is provided integrally with a cylindrical ring portion 21, which is inserted along an inner peripheral wall of the upstream side of the duct 14.

A diameter increasing portion 22 whose diameter is increased toward the upstream side is provided at the inner peripheral part of the upstream side of the duct 14. This diameter increasing portion 22 is a cylindrical wall, and the ring portion 21 is inserted to an inner peripheral surface of the diameter increasing portion 22. A positioning projection 23 that is along the tube length direction of the duct 14 is formed on a part of an inner wall of the diameter increasing portion 22. A positioning groove 24 that is along a tube length direction of the ring portion 21 is formed on a part of an outer peripheral wall of the ring portion 21. By inserting the ring portion 21 into the duct 14 with the positioning projection 23 and the positioning groove 24 fitted together, the straightening plate 4 is positioned relative to the duct 14. The duct 14 and the ring portion 21 may be removable members by use of, for example, fitting of their engagement parts, or may be undetachable members using an adhesive and welding technology.

The straightening plate 4 illustrated in this embodiment has a shape whose plate width along the air flow direction is the same in size as the tube length of the ring portion 21 and whose radial length is the same as the diameter of the ring portion 21. The plate 4 has a shape obtained by perpendicularly intersecting two straightening plates 4. Therefore, the straightening grid 5 has a cross shape when viewed from the upstream side of the duct 14. There is provided only one crossing region α of the straightening plates 4 of the straightening grid 5.

As a result of the fitting between the positioning projection 23 and the positioning groove 24 described above, the straightening plate 4 is positioned relative to the duct 14. Consequently, the AFM 3 and the straightening plate 4, which are attached to the duct 14, are positioned. A positional relationship between the AFM 3 and the straightening plate 4 is set, such that the straightening plate 4 and the air inlet 2 of the AFM 3 overlap with each other when viewed from the air flow direction (i.e., when viewed from the upstream side of the duct 14) as illustrated in FIG. 1A.

Specifically, in this embodiment, as illustrated in FIG. 1A, when viewed from the upstream side of the duct 14, the center of the AFM housing 18 which is inserted in the duct 14 (region in which the bypass passage and so forth are formed) in its width direction, and the center of the straightening plate 4 in its thickness direction coincide with each other. Even more specifically, in this embodiment, the crossing region α of the straightening plates 4, and a generally central portion of the air inlet 2 of the AFM 3 coincide with each other when viewed from the upstream side of the duct 14 as illustrated in FIG. 1A.

Figure 5B:
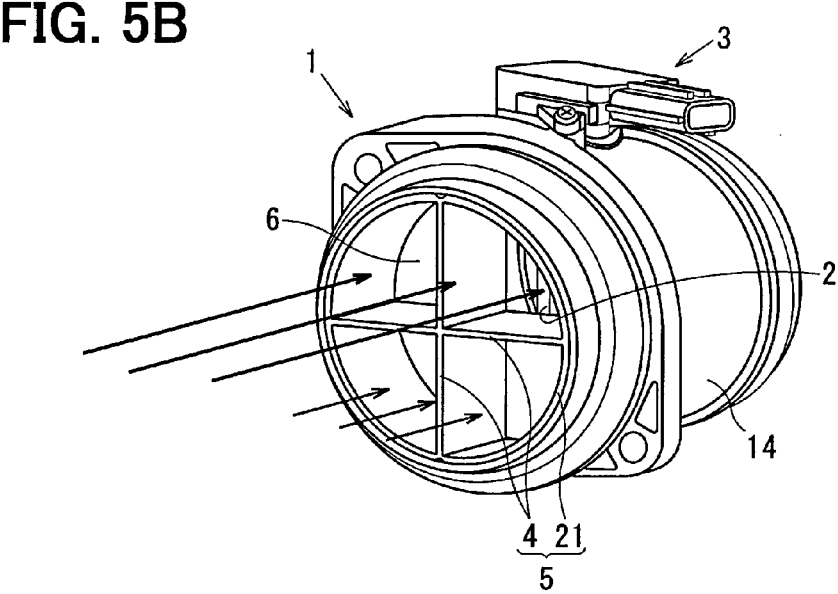
FIG. 5B is a diagram illustrating unevenness of a flow speed according to the embodiment.

The mesh member 6 is disposed between the straightening grid 5 and the AFM 3 (specifically, in this embodiment, a downstream end of the straightening grid 5). As illustrated in FIG. 5B, the member 6 equalizes unevenness (see arrows in FIG. 5B) of a flow speed of air toward the air inlet 2 of the AFM 3. The mesh member 6 of this embodiment is, for example, a gauze made of thin stainless lines, and is cut off in a circle having a diameter that is in accordance with an inner diameter of the diameter increasing portion 22. The mesh member 6 is not limited to a gauze, and a resin mesh may be employed for the member 6.

The mesh member 6 is fixed in the duct 14 between the ring portion 21 of the straightening grid 5 and a level difference 22a of the diameter increasing portion 22 of the duct 14. A metal frame 25 held between the ring portion 21 and the level difference 22a (in addition, a resin material, rubber material, and so forth may also be used for the frame 25) is provided in a ring shape for the peripheral edge of the mesh member 6. Needless to say, a technology for fixing the mesh member 6 is not limited, and the mesh member 6 may be disposed at the rear end of the straightening grid 5 or in the duct 14 by another technology such as welding technology or insertion technology.

A first effect of the embodiment will be described. In the AFM assy 1 in this embodiment, the straightening grid 5 using the straightening plate 4 is disposed on the upstream side of the AFM 3 in the air flow direction. Accordingly, even if the swirl flow (rotating flow) is generated in the airflow, the swirl flow can be reset to a linear flow through the straightening grid 5, and the linear flow can be introduced into the AFM 3. The unevenness of the flow speed can be averaged through the mesh member 6 disposed between the straightening grid 5 and the AFM 3, and an air flow with its uneven flow speed limited can be guided to the AFM 3. Thus, by use of the combination of the straightening grid 5 and the mesh member 6, the output of the AFM 3 can be stabilized.

Figure 6A:
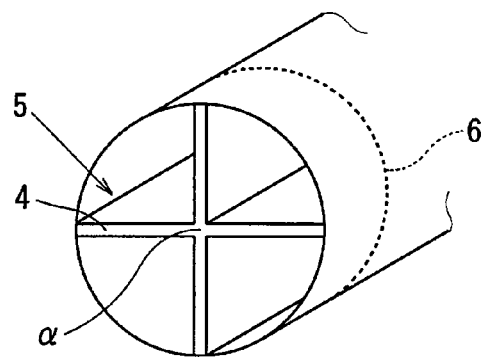
FIG. 6A is a diagram illustrating the number of crossing positions (cross parts) of straightening plates according to the embodiment.
Figure 6B:
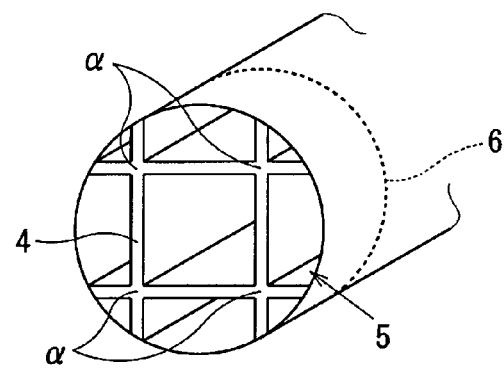
FIG. 6B is a diagram illustrating the number of crossing positions (cross parts) of the straightening plates according to the embodiment.
Figure 6C:
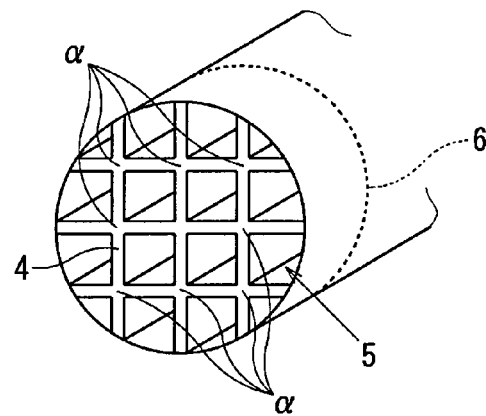
FIG. 6C is a diagram illustrating the number of crossing positions (cross parts) of the straightening plates according to the embodiment.

A second effect of the embodiment will be described. In the straightening grid 5 disposed on the upstream side of the AFM 3 in the air flow direction, there is only one crossing region α of the straightening plates 4 that constitute a cross shape. Accordingly, a pressure loss caused due to the increase in the number of crossing regions a can be limited. This will be illustrated with reference to FIGS. 6A to 7. FIG. 6A is a diagram illustrating the straightening grid 5 with only one crossing region α of the straightening plates 4 constituting a cross shape. FIG. 6B is a diagram illustrating the straightening grid 5 with four crossing regions a of the straightening plates 4 constituting cross shapes. FIG. 6C is a diagram illustrating the straightening grid 5 with nine crossing regions α of the straightening plates 4 constituting cross shapes.

Figure 7:
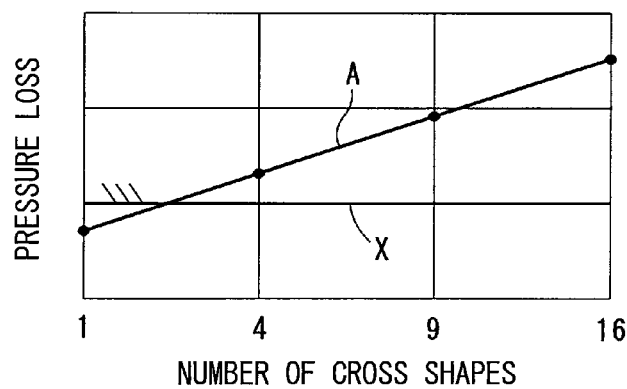
FIG. 7 is a graph illustrating a relationship between the number of the crossing positions and a pressure loss according to the embodiment.

There is shown in FIG. 7 a relationship between the crossing region(s) α of the straightening plates 4 constituting the cross shape(s) and the pressure loss when the mesh member 6 is provided immediately downstream of the straightening grid 5, and the number of the crossing region(s) α of the straightening plates 4 constituting the cross shape(s) is changed to one, four, nine, and sixteen as illustrated in FIGS. 6A to 6C.

As indicated by a continuous line A in FIG. 7, in accordance with the increase of the number of the crossing region(s) α of the straightening plates 4 constituting the cross shape (s), the pressure loss becomes large. The pressure loss is lower than a target value X of pressure loss only in the case of the single crossing region α of the straightening plates 4 constituting the cross shape. The AFM assy 1 in this embodiment can make the pressure loss lower than its target value X.

A third effect of the embodiment will be described. In the straightening grid 5 disposed on the upstream side of the AFM 3 in the air flow direction, there is only one crossing region α of the straightening plates 4 that constitute a cross shape. Accordingly, generation of a turbulent flow due to the increase of the number of the crossing region(s) α of the straightening plates 4 can be prevented, and the signal fluctuation of the AFM 3 because of the turbulent flow can thereby be limited. This will be described in reference to FIGS. 6A to 6C and 8. There is shown in FIG. 8 a relationship between the crossing region(s) a of the straightening plates 4 constituting the cross shape(s) and the signal fluctuation of the AFM 3 when the mesh member 6 is provided immediately downstream of the straightening grid 5, and the number of the crossing region(s) α of the straightening plates 4 constituting the cross shape(s) is changed to one, four, nine, and sixteen as illustrated in FIGS. 6A to 6C.

Figure 8:
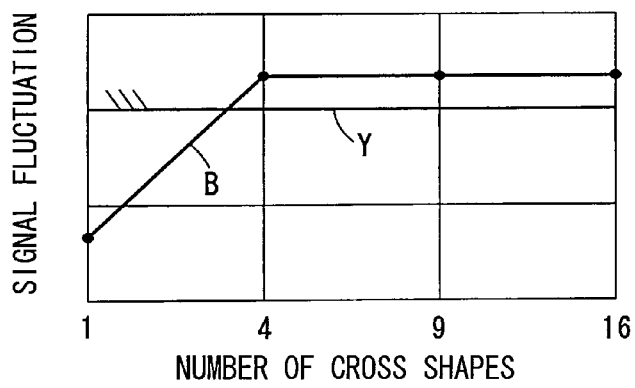
FIG. 8 is a graph illustrating a relationship between the number of the crossing positions and a signal fluctuation according to the embodiment.

As indicated by a continuous line B in FIG. 8, the signal fluctuation becomes large in accordance with the increase of the number of the crossing region(s) α of the straightening plates 4 constituting the cross shape(s). The signal fluctuation is lower than a target value Y of the signal fluctuation only in the case of the single crossing region α of the straightening plates 4 constituting the cross shape. The AFM assy 1 in this embodiment can make the signal fluctuation of the AFM 3 lower than its target value Y.

A fourth effect of the embodiment will be described. In the AFM assy 1 in this embodiment, the straightening plate 4 and the air inlet 2 overlap with each other when viewed from the air flow direction. Specifically, when viewed from the upstream side of the duct 14, the straightening plate 4 coincides with the center of the AFM housing 18 which is inserted in the duct 14 (region in which the bypass passage and so forth are formed) in its width direction. Accordingly, a flow of air guided to the air inlet 2 can be reliably stabilized through the straightening plate 4. A degree of stability of the output of the AFM 3 can thereby be increased.

Figure 1B:
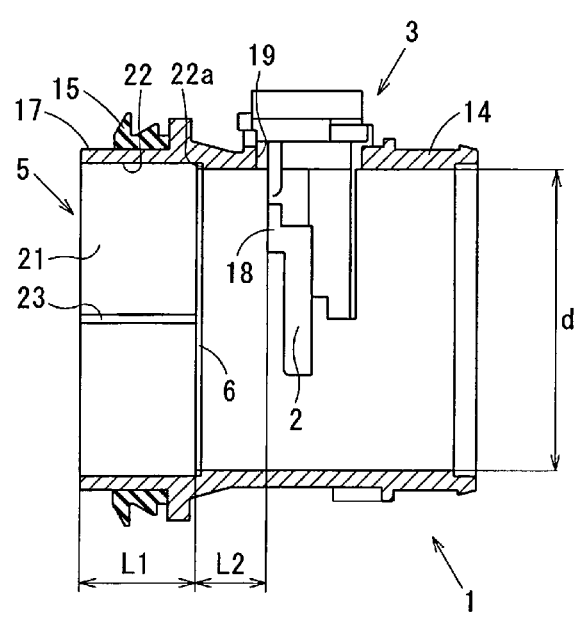
FIG. 1B is a sectional view illustrating the AFM assy of the embodiment.

A fifth effect of the embodiment will be described. The AFM assy 1 in this embodiment is configured to satisfy a relation of L1>0.3d provided that a length of the straightening plate 4 in the air flow direction (width of the straightening plate 4 when viewed from a direction perpendicular to the air flow direction) is L1; and an inner diameter of the duct 14, to which the AFM 3, the straightening grid 5, and the mesh member 6 are attached, is "d", as illustrated in FIG. 1B. Accordingly, the swirl flow can stably be straightened into a linear flow, and the output of the AFM 3 can thereby be stabilized.

Figure 9:
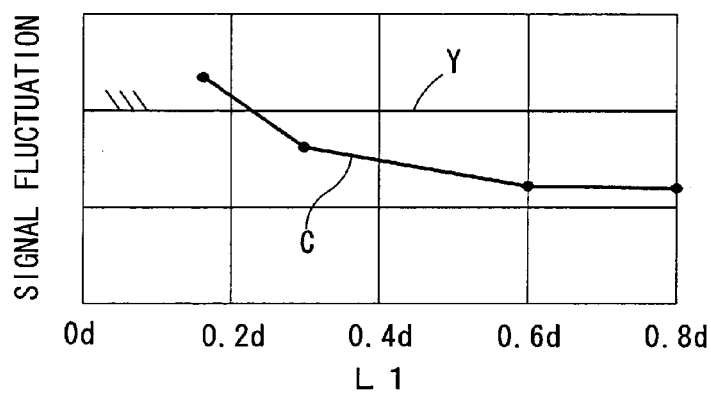
FIG. 9 is a graph illustrating a relationship between a length of the straightening plate in an air flow direction and the signal fluctuation according to the embodiment.

This will be explained with reference to FIG. 9. There is shown in FIG. 9 a relationship between the length L1 of the straightening plate 4 and the signal fluctuation of the AFM 3 when the mesh member 6 is provided immediately downstream of the straightening grid 5 and the length L1 of the straightening plate 4 is changed in a range of approximately 0.2 to 0.8d. As indicated by a continuous line C in FIG. 9, when the length L1 of the straightening plate 4 is shorter than 0.3d, the signal fluctuation rapidly becomes large. By making the length L1 of the straightening plate 4 longer than 0.3d, the signal fluctuation of the AFM 3 in the AFM assy 1 can be made lower than the target value Y.

A sixth effect of the embodiment will be described. The AFM assy 1 of this embodiment is configured to satisfy a relation of L2<0.8d given that a length from the downstream end of the straightening plate 4 to the AFM 3 in the air flow direction is L2; and the inner diameter of the duct 14, to which the AFM 3, the straightening grid 5, and the mesh member 6 are attached, is "d" as illustrated in FIG. 1B. When the distance L2 between the downstream end of the straightening plate 4 and the AFM 3 becomes longer, the turbulent flow becomes significant due to a wall surface resistance of the duct 14. Accordingly, by setting the distance L2 between the downstream end of the straightening plate 4 and the AFM 3 at L2<0.8d, the generation of the turbulent flow due to the wall surface resistance of the duct 14 can be limited. As a result, the output of the AFM 3 can be stabilized.

Figure 10:
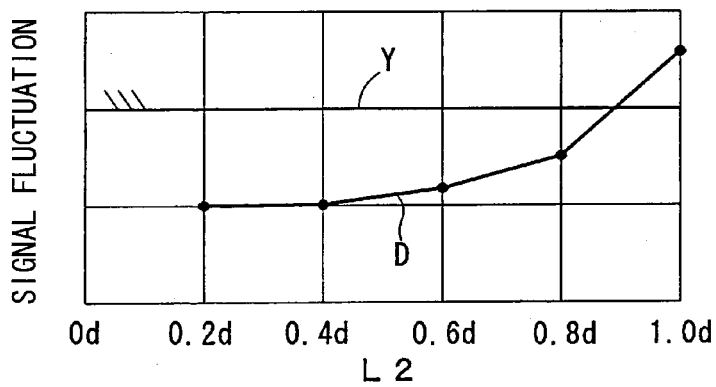
FIG. 10 is a graph illustrating a relationship between a distance from a downstream end of the straightening plate to an AFM and the signal fluctuation according to the embodiment.

This will be explained with reference to FIG. 10. There is shown in FIG. 10 a relationship between the distance L2 between the downstream end of the straightening plate 4 and the AFM 3, and the signal fluctuation of the AFM 3 when the mesh member 6 is provided immediately downstream of the straightening grid 5; and the distance L2 between the downstream end of the straightening plate 4 and the AFM 3 is changed in a range of approximately 0.2 to 1.0. As indicated by a continuous line D in FIG. 10, when the distance L2 between the downstream end of the straightening plate 4 and the AFM 3 is longer than 0.8d, the signal fluctuation becomes large rapidly. By making the distance L2 between the downstream end of the straightening plate 4 and the AFM 3 shorter than 0.8d, the signal fluctuation of the AFM 3 in the AFM assy 1 can be made lower than the target value Y.

Industrial applicability of the AFM assy 1 will be described below. In the above embodiment, it is illustrated that the AFM assy 1 of the present disclosure is applied to the AFM 3 disposed immediately downstream of the air cleaner 10. However, the arrangement position of the AFM 3 is not limited to this, and the AFM assy 1 of the present disclosure may be applied to the AFM 3 disposed at a position different from immediately downstream of the air cleaner 10.

In the above embodiment, it is illustrated that the AFM 3, the straightening grid 5, and the mesh member 6 are attached to the dedicated duct 14 so that they are assembled together (unitized). Alternatively, the AFM assy 1 of the present disclosure may be implemented with the straightening grid 5 and the mesh member 6 disposed at an upstream region of the AFM 3 without assembling them together.

In the above embodiment, it is illustrated that the crossing region α of the straightening plates 4 is located at the center of the duct 14 (center of the ring portion 21). However, instead of this, the crossing region α may be located at a position eccentric relative to the center of the duct 14.

In the above embodiment, it is illustrated that the straightening plates 4 are arranged to intersect with each other in a cross shape. However, the AFM assy 1 is not limited to the assy in which the straightening plate 4 extends in four directions from the crossing region α (assy in which the straightening plates 4 constitute a cross shape). The assy in which the straightening plate 4 extends in three directions from the crossing region α (assy in which the straightening plates 4 constitute a Y-shape) may be employed. Or, the assy in which the straightening plate 4 extends in five (e.g., star shape) or more directions radially from the crossing region α (assy in which the straightening plate 4 is formed in a shape having five or more radiations) may also be employed.

In the above embodiment, it is illustrated that an upstream edge and downstream edge of the straightening plate 4 are both disposed perpendicularly to the air flow direction. Alternatively, at least one of the upstream edge and downstream edge of the straightening plate 4 may be disposed at a slant on the upstream side or downstream side in the air flow direction.

To sum up, the air flow measuring device 1 of the above embodiment can be described as follows.

In the air flow measuring device 1, the straightening grid 5 using the straightening plate 4 is disposed on the upstream side of the AFM 3 in the air flow direction. Accordingly, even if the swirl flow (rotating flow) is generated in the airflow, the swirl flow can be reset to a linear flow through the straightening grid 5, and the linear flow can be introduced into the AFM 3. The unevenness of the flow speed can be averaged through the mesh member 6 disposed between the straightening grid 5 and the AFM 3, and an air flow with its uneven flow speed limited can be guided to the AFM 3. In this manner, by use of the combination of the straightening grid 5 and the mesh member 6, the output of the AFM 3 can be stabilized.

In the straightening grid 5 disposed on the upstream side of the AFM 3 in the air flow direction, there is only one crossing region α of the straightening plates 4. Accordingly, a pressure loss caused due to the increase in the number of crossing regions α can be limited. Moreover, since there is only one crossing region α of the straightening plates 4, generation of a turbulent flow due to the increase of the number of the crossing region(s) α of the straightening plates 4 can be prevented, and the signal fluctuation of the AFM 3 because of the turbulent flow can thereby be limited. As a result, the output of the AFM 3 can be stabilized by limiting the pressure loss.

The straightening plate 4 and the air inlet 2 may overlap with each other when viewed from the flow direction of air. Accordingly, a flow of air guided to the air inlet 2 can be reliably stabilized through the straightening plate 4. Thus, a degree of stability of the output of the AFM 3 can thereby be increased.

The air flow measuring device 1 may further include a duct 14 to which the AFM 3, the straightening grid 5, and the mesh member 6 are attached. A relation of $L1>0.3d$ may be satisfied given that: a length of the straightening plate 4 in the flow direction of air is L1; and a size of an inner diameter of the duct 14 is d. Accordingly, the swirl flow can stably be straightened into a linear flow, and the output of the AFM 3 can thereby be stabilized.

The air flow measuring device 1 may further include a duct 14 to which the AFM 3, the straightening grid 5, and the mesh member 6 are attached. A relation of $L2<0.8d$ may be satisfied given that: a length from a downstream end of the straightening plate 4 to the AFM 3 in the flow direction of air is L2; and a size of an inner diameter of the duct 14 is d. When the distance between the downstream end of the straightening plate 4 and the AFM 3 becomes large, there is a possibility that the turbulent flow becomes significant due to the wall surface resistance of the duct 14. Accordingly, by setting the distance between the downstream end of the straightening plate 4 and the AFM 3 at $L2<0.8d$, the generation of the turbulent flow because of the wall surface resistance of the duct 14 can be limited, and the output of the AFM 3 can be stabilized.

The air flow measuring device 1 may further include a duct 14 for flow measurement. The AFM 3, the straightening grid 5, and the mesh member 6 are attached to the duct 14 thereby to constitute an AFM assembly (assy) 1.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An air flow measuring device comprising:
   an air flow meter (AFM) that includes an air inlet and is configured to measure a flow rate of air flowing into the air inlet;
   a straightening grid that includes a straightening plate having only one crossing region when viewed from a flow direction of air and that is disposed on an upstream side of the AFM in a flow direction of air to straighten a flow of air toward the AFM through the straightening plate; and
   a mesh member that is formed in a netted manner and is disposed between the straightening plate and the AFM.

2. The air flow measuring device according to claim 1, wherein the straightening plate and the air inlet overlap with each other when viewed from the flow direction of air.

3. The air flow measuring device according to claim 1, further comprising a duct to which the AFM, the straightening grid, and the mesh member are attached, wherein a relation of $L1>0.3d$ is satisfied given that:
   a length of the straightening plate in the flow direction of air is L1; and
   a size of an inner diameter of the duct is d.

4. The air flow measuring device according to claim 3, wherein the only one crossing region is located at the center of the duct.

5. The air flow measuring device according to claim 1, further comprising a duct to which the AFM, the straightening grid, and the mesh member are attached, wherein a relation of $L1>0.8d$ is satisfied given that:
- a length from a downstream end of the straightening plate to the AFM in the flow direction of air is $L2$; and
- a size of an inner diameter of the duct is d.

6. The air flow measuring device according to claim 1, further comprising a duct for flow measurement, wherein the AFM, the straightening grid, and the mesh member are attached to the duct thereby to constitute an AFM assembly (assy).

7. The air flow measuring device according to claim 1, wherein the straightening plate has the only one crossing region when viewed from an upstream side of the straightening plate.

* * * * *